United States Patent
Smith et al.

(10) Patent No.: US 12,393,587 B2
(45) Date of Patent: Aug. 19, 2025

(54) SYSTEMS AND METHODS FOR SCHEDULING INFORMATION RETRIEVAL

(71) Applicant: Xero Limited, Wellington (NZ)

(72) Inventors: Patrick Smith, Wellington (NZ); Lucian Mustatea, Wellington (NZ); Torrey Glendinning, Wellington (NZ); Judy Lei, Wellington (NZ); Michael Atlin, Wellington (NZ); Justin Palumbo, Wellington (NZ)

(73) Assignee: XERO LIMITED (NZ)

( * ) Notice: Subject to any disclaimer, the term of this patent is extended or adjusted under 35 U.S.C. 154(b) by 0 days.

(21) Appl. No.: 17/763,569

(22) PCT Filed: Aug. 19, 2021

(86) PCT No.: PCT/NZ2021/050137
§ 371 (c)(1),
(2) Date: Mar. 24, 2022

(87) PCT Pub. No.: WO2022/216160
PCT Pub. Date: Oct. 13, 2022

(65) Prior Publication Data
US 2024/0054130 A1    Feb. 15, 2024

(30) Foreign Application Priority Data
Apr. 8, 2021   (AU) .............................. 2021901020

(51) Int. Cl.
*G06F 16/2455*   (2019.01)
*G06F 16/2453*   (2019.01)
*G06F 21/31*   (2013.01)

(52) U.S. Cl.
CPC .... *G06F 16/2455* (2019.01); *G06F 16/24542* (2019.01); *G06F 21/31* (2013.01)

(58) Field of Classification Search
None
See application file for complete search history.

(56) References Cited

U.S. PATENT DOCUMENTS

| | | | |
|---|---|---|---|
| 10,636,087 B1 | 4/2020 | Bardouille et al. | |
| 11,314,881 B2 * | 4/2022 | Song | G06N 20/00 |

(Continued)

FOREIGN PATENT DOCUMENTS

WO    2013160721 A1    10/2013

OTHER PUBLICATIONS

Extended European Search Report mailed dated Jul. 31, 2024, in European Application No. 21936171.4, 5 pages.

(Continued)

*Primary Examiner* — Dawaune A Conyers (57) ABSTRACT

Described embodiments relate to methods, systems and computer program product for scheduling retrieval of candidate information from a first entity system at the predicted time. The method comprises determining a dataset associated with historical information issued by a first entity, wherein the dataset comprises a plurality of entries, each entry comprising an information date; determining a period of successful retrieval of information issued by the first entity, or a period of issuance of information by the first entity, based on the information dates of the plurality of entries in the dataset; determining a predicted time of issuance of future information by the first entity based on the determined period; and scheduling retrieval of candidate information from a first entity system at the predicted time.

19 Claims, 2 Drawing Sheets

(56) References Cited

U.S. PATENT DOCUMENTS

| | | |
|---|---|---|
| 2008/0010365 A1 | 1/2008 | Schneider |
| 2012/0191502 A1 | 7/2012 | Gross et al. |
| 2013/0226967 A1 | 8/2013 | Gross et al. |
| 2016/0092598 A1 | 3/2016 | Mishra |
| 2017/0091320 A1 | 3/2017 | Psota et al. |
| 2019/0228038 A1 | 7/2019 | Mishra |
| 2022/0342877 A1* | 10/2022 | Clark .................. G06F 21/6227 |

OTHER PUBLICATIONS

Farley, "Cognitive Computing, Analytics, and Personalization", IEEE Aug. 2015, retrieved on Nov. 24, 2021. https://ieeexplore.ieee.org/stamp/stamp.jsp?tp=&amumber=7160901.
International Search Report and Written Opinion as issued in connection with International Patent Application No. PCT/NZ21/050137, mailed Dec. 27, 2021, 22 pages.

\* cited by examiner

SYSTEMS AND METHODS FOR SCHEDULING INFORMATION RETRIEVAL

TECHNICAL FIELD

Embodiments generally relate to systems, methods and computer-readable media for determining schedules for information retrieval from third party sources. Some embodiments further relate to scheduling information retrieval and/or retrieving information according to a determined schedule.

BACKGROUND

Automated collection and importation of financial information or documents from third party sources, such as websites, to an accounting system allows the information in the accounting system to be kept up-to-date without the need for user intervention. However, scheduling the collection of financial documents can be challenging. Performing collection too often can mean that the subsequent document is not yet available (and consequently computing resources are wasted). On the other hand, performing collection too late can mean that the accounting system is often out-of-date.

It is desired to address or ameliorate one or more shortcomings or disadvantages associated with prior collection and importation processes, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to a method comprising a method comprising: determining a dataset associated with historical information issued by a first entity, wherein the dataset comprises a plurality of entries, each entry comprising an information date determining a period of successful retrieval of information issued by the first entity based on the information dates of the plurality of entries in the dataset; determining a predicted time of issuance of future information by the first entity based on the determined period; and scheduling retrieval of candidate information from a first entity system at the predicted time. For example, the information date may be a retrieval date indicative of the date on which the particular information was retrieved.

Some embodiments relate to a method comprising: determining a dataset associated with historical information issued by a first entity, wherein the dataset comprises a plurality of entries, each entry comprising an information date; determining a period of issuance of information by the first entity based on the information dates of the plurality of entries in the dataset; determining a predicted time of issuance of future information by the first entity based on the determined period; and scheduling retrieval of candidate information from a first entity system at the predicted time. For example, the information date may be an issuance date indicative of the date of issuance of the particular information by the first entity. The information date may be an estimated issuance date indicative of an estimated date of issuance of the particular information by the first entity.

In some embodiments, determining the period of successful retrieval of information may comprise: determining a successful retrieval date for at least some of the plurality of the entries of the dataset; and determining a representative time for performing fetching runs as a function of the determined successful retrieval dates.

In some embodiments, determining a representative time for performing fetching runs as a function of the determined successful retrieval dates may comprise determining the median of the determined successful retrieval dates as the representative time.

In some embodiments, determining the predicted time of issuance of future information by the first entity based on the determined period comprises: determining a cadence of issuance of the information by the first entity for the user.

In some embodiments, determining the cadence of issuance of information by the first entity may comprise one or more of: (i) receiving input from a user via a user interface, the input indicative of the cadence of issuance of information by the first entity; and (ii) receiving cadence information indicative of the cadence of issuance of information from the first entity.

In some embodiments, determining the cadence of issuance of the information may comprise: determining one or more intervals, each interval indicative of a difference between a first date of first information of the plurality of entries in the dataset and a next closest second date of second information of the plurality of entries; and determining the cadence of issuance as a function of the one or more intervals.

In some embodiments, determining the cadence of issuance as a function of the one or more intervals may comprise determining the cadence of issuance as a median of the one or more intervals.

The method may comprise: determining an information date of the candidate information; determining that the information date of the candidate information corresponds with an information date of a previously retrieved candidate information issued by the first entity and associated with the user's account; determining a later predicted time; and scheduling retrieval of a subsequent candidate information associated with the user's account with the first entity from the system associated with the first entity at the later predicted time.

The method may comprise: determining metadata of the candidate information; determining that the metadata of the candidate information corresponds with metadata of a previously retrieved candidate information issued by the first entity and associated with the user's account; determining a later predicted time; and scheduling retrieval of a subsequent candidate information associated with the user's account with the first entity from the system associated with the first entity at the later predicted time. For example, the later predicted time may be a predefined number of hours after the predicted time.

The method may further comprise: determining that subsequent candidate information is available at the updated predicted time; adding the subsequent candidate information to the dataset to generate an updated dataset; determining an updated period of successful retrieval of information based on the updated dataset; determining an updated predicted time of issuance of future information by the first entity based on the determined updated period; and scheduling retrieval of subsequent candidate information from a system associated with the first entity at the updated predicted time.

The method may further comprise determining a confidence score for the determined period and/or the predicted future times. The method may further comprise determining that the confidence score is below a confidence threshold; and changing the determined predicted future time to a later time.

The historical information of the dataset may be historical information issued by the first entity in connection with a user's account with the first entity. The dataset may be one of a plurality of sub-datasets of a super-dataset of historical information issued by the first entity and associated with the user's account, each of the plurality of sub-datasets being associated with a respective subaccount of the user's account with the first entity and wherein the plurality of entries of the dataset are associated with a first subaccount of the user's account with the first entity.

The method further comprising: determining user credentials associated with the user's account with the first entity system; and using the user credentials to access the user's account and retrieve the candidate information.

The information associated with each of the plurality of entries may comprise a financial document. The information associated with each of the plurality of entries may comprise details of one or more of: (i) bank account statement(s); (ii) invoices; (iii) credit notes; and (iv) tax return documentation.

The period may be one of: (i) a particular day of the week, month or year; and (ii) a date of the month or year. The predicted time may comprise a time of the day.

The method may further comprise: retrieving the candidate information at the predicted time. Retrieving the candidate information may comprise: importing the candidate information into a user's account of a document management system. The user's account of a document management system may be a user's bookkeeping account of an accounting system.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform any one of the described methods.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Various ones of the appended drawings merely illustrate example embodiments of the present disclosure and cannot be considered as limiting its scope.

DESCRIPTION OF EMBODIMENTS

Embodiments generally relate to systems, methods and computer-readable media for determining schedules for information retrieval from third party sources. Some embodiments further relate to scheduling information retrieval and/or retrieving information according to a determined schedule. For example, the determined schedule may be bespoke to the particular third party source, such as a particular third party system or server.

The retrieval of information may be performed by fetching applications or web crawler applications (for example, "bots"). For example, the fetching application may be used by accounting systems or other document management systems to automatically collect (or scrape) and import information from third party sources, such as websites. Such applications may employ user credentials to access and retrieve user information associated with a user account with a third party source. For example, the fetching application may use a user's login details to access the user's account with an energy provider to retrieve information, such as an energy bill, from the website of the energy provider.

In the case of the fetching application being deployed on an accounting system, this information may be imported into the accounting system and associated with the user's account with the accounting system for use in managing the user's bookkeeping accounts. The accounting system may comprise multiples of such fetching applications, each being bespoke or tailored for a particular third party source or website, such as banks, telecommunications companies, utility providers etc. The information or documents to be retrieved may include, for example, utility bills, such as phone bills and/or electricity bill, credit card bills, tax documents, bank account statements (such as current account, saving account, check account etc.), and the like. These types of information or documents tend to have a regular pattern or cadence associated with when they issue, such as monthly or annually. In some embodiments, the information or documents to be retrieved may include cheques, cheque images, or similar that are generally issued or generated, or appear to be issued or generated, on an ad hoc basis, but may in fact be indicative of patterns in deposits and/or withdraws.

As opposed to attempts to retrieve information from the third party source (fetching runs) being scheduled to be performed according to fixed contextual business logic, or at a fixed time interval, for example, every 24 hours, the described embodiments facilitate determining a prediction or "best guess" of when desired information will be available for retrieval from a particular third party source. A fetching run may then be scheduled according to the predicted time of availability of the information.

In some embodiments, a scheduling application is configured to determine a predicted future time of availability of information (e.g. user account related information) at a system associated with a third party source based on historical records of retrieving such information from the system. For example, the scheduling application may be configured to determine the predicted future time of availability of desired information at a particular third party source based on historical information about attempted prior fetching runs for the particular third party source. The historical information may comprise information about successful fetching runs and/or unsuccessful fetching runs.

In some embodiments, the scheduling application is configured to determine a predicted future time of availability of information (e.g. user account related information) at a system associated with a third party source based on historical records of issuance or availability of such information from the system. For example, the scheduling application may be configured to determine the predicted future time of availability of desired information at a particular third party source based on historical information about issuance or availability dates (or dates and times) for the particular third party source. The historical information may comprise issuance dates for the information.

The historical information may comprise a dataset for each of a plurality of third party sources. In some embodiments, the dataset may include an entry for each successful fetching run. The entry may include an information date. The information date may comprise or be a retrieval date and in some embodiments, retrieval date and retrieval time, of when desired information was successfully retrieved. In some embodiments, the information date may comprise or be an issue date (or available date) indicative of when the information, or a document detailing the information was considered to have been made available or issued by the third party source. For example, some third party sources make documents or information available on their system to account holders before the actual date of issue indicated on the document. Alternatively or in addition, the dataset may comprise, for each entry, the document retrieved on the indicted retrieval date.

In some embodiments, the scheduling application is configured to determine a cadence of the issuance of a particular type of information or document type. For example, the cadence of issuance may be weekly, monthly, fortnightly, quarterly, annually etc. The determined cadence may be used to determine how regularly a fetching run is to be scheduled to retrieve particular information from the third party source.

In some embodiments, the scheduling application is configured to determine a plurality of successful retrieval dates for each of the entries of the dataset and determine a representative time for performing fetching runs, such as a date or day of the month (e.g., the last Tuesday of the month), and in some embodiments, a time of the day, based on the plurality of successful retrieval dates. In some embodiments, the representative time is a function of the retrieval times of successful fetching runs of the dataset. In some embodiments, the representative time is the median of the plurality of retrieval times of successful fetching runs of the dataset.

In some embodiments, the scheduling application is configured to determine a plurality of issuance dates for each of the entries of the dataset and determine a representative time for performing fetching runs, such as a date or day of the month (e.g., the last Tuesday of the month), and in some embodiments, a time of the day, based on the plurality of issuance dates. In some embodiments, the representative time is a function of the issuance times of successful fetching runs of the dataset. In some embodiments, the representative time is the median of the plurality of issuance times of successful fetching runs of the dataset.

The scheduling application may be configured to determine a period based on the determined cadence and the determined representative time for performing fetching runs. For example, the period may be monthly on the $14^{th}$, or quarterly on the first Tuesday of the third month.

In some embodiments, the scheduling application is configured to determine the cadence and/or the period of information or a document type, which may be associated with a particular user account with the third party source. For example, multiple datasets may be maintained for a single third party source, each being associated with a different account of the user with that third party source. For example, this may be the case where the third party source is a financial institution and the user has multiple accounts with the financial institution, such as a mortgage account, a savings account and credit card account.

The scheduling application may determine one or more predicted future times for performing a next or future fetching runs for a particular user account with a particular third party system based on the determined period. The scheduling application may determine a schedule for performing future fetching runs based on the one or more predicted future times. In some embodiments, the system determines confidence scores for determined periods and/or predicted future time(s) for the datasets. The system may determine whether to schedule fetching runs at the predicted future time(s) based on the associated confidence scores. In some embodiments, for example, where confidence scores are relatively low, the scheduling application may modify the predicted future time(s) to instead perform the fetching runs at a later time and/or date, to thereby increase confidence in the success of the fetching run. In some embodiments, the system is configured to more heavily weigh the importance of having up-to-date data against the cost of performing unsuccessful fetching runs (including computational and/or resourcing cost), or vice versa. Alternatively, or in addition to confidence scores, such weightings may impact a decision to schedule a fetching run at a particular predicted future time or to perform it at a later time instead.

A fetching application may be configured to retrieve, or perform fetching runs, according to the predicted future time(s) or schedule determined by the scheduling application. For example, the fetching application may seek to retrieve information from the third party system at the predicted time for that system as determined by the scheduling application. The fetching application may determine user credentials associated with the user's account with the third party system and use the user credentials to access the user's account and retrieve the candidate information. The fetching application may import the candidate information into a user's account of a document management system, such as a bookkeeping account for the user maintained in an accounting system.

In some embodiments, for example where little or no historical records are available, the scheduling application may determine the cadence of issuance to be an estimated cadence, such as every 24 hours. The fetching application may attempt to retrieve information from the third party system according to the estimated cadence, and once successful, the date of the successful retrieval of the information may be determined to be an estimated available or issuance date for subsequent cadence and/or periodicity determinations for determining predicted future time(s).

In some embodiments, the scheduling application is configured to dynamically or periodically update the predicted future times and/or the schedule as new retrieval times are added to entries of the dataset. This allows for any changes in behaviours regarding the issuance or making available of information by the third party systems to be accounted for by the scheduling application and for the schedule to be adapted as required.

Performing fetching runs according to a fixed contextual business logic for a respective third party source, or at a fixed time interval may not also achieve the desired result of acquiring the desired information, and can lead to suboptimal use of computational resources. By scheduling fetching runs at predicted times, fewer fetching runs may need to be performed in order to acquire or import the required information. Such fetching runs utilise network connection resources, disk space, and computation power. By accurately predicting the time when desired information will be available for retrieval from a particular third party source, or indeed even predicting a time close to the time at which the desired information will be available for retrieval, may reduce or minimise the number of fetching runs required to be performed. This can result in a more resource efficient fetching process. This may also allow more efficient scalability of underlying infrastructure of the system 102.

From time to time, third party systems 106 may alter their protocols or system configurations which may change how fetching applications 118 interact with them, and accordingly connections between the fetching applications 118 of the system 102 and the third party systems 106 may fail, or break. As a result, multiple attempts may be made before the information is successfully retrieved. This may result in the retrieval date for the information stored in the associated entry of the dataset being later than perhaps the information was available to be retrieved. However, as the scheduling application may be configured to determine predicted future times for retrieving information based on historical information associated with multiple successful retrievals, any impact caused by such disruptions such as late retrieved information will be an outlier and may have negligible effect on the determination of the predicted future times. In embodiments where the issuance dates of the historical records are available and used to determine the predicted future times, the late retrieval of the document will not impact the determination of the predicted future times. Where one or more delays in retrieving information from a particular system due to a connection or similar issue have occurred in the past, a typical time delay in retrieving information with the particular system due to such issues may be determined from the historical information, for example, based on an average of such delays. A delay may be determined as the time (for example, the number of hours or days) between the predicted or issued date and an actual retrieval date.

An accurate or close to accurate prediction of the time when the desired information will be available also allows for the desired information to be retrieved automatically as soon as possible after it has been made available. Timely retrieval and importation of the desired information to the relevant management system means that the information available to the management system is current or up-to-date. In the case of an accounting system, this can assist in management of a user's finances, allowing the user and/or their accountant to ensure the user's bookkeeping accounts are up-to-date, reducing or eliminating any onus on the user or accountant to acquire or instigate the importation of the desired document to ensure currency.

In some embodiments, the scheduling application may be configured to undertake an optimisation process with a view to scheduling a fetching run as close to the time the information will be available at the third party system. This optimisation process may be a trial and error process to determine an optimised predicted future time with sufficient confidence of success. For example, based on the historical information the scheduling application may schedule a fetching run for three days after the issue date of the information. When performing the optimisation process, the scheduling application may attempt to retrieve the information earlier, and if successful, may update the predicted future time to the earlier time as an optimised predicted future time.

Figure 1:
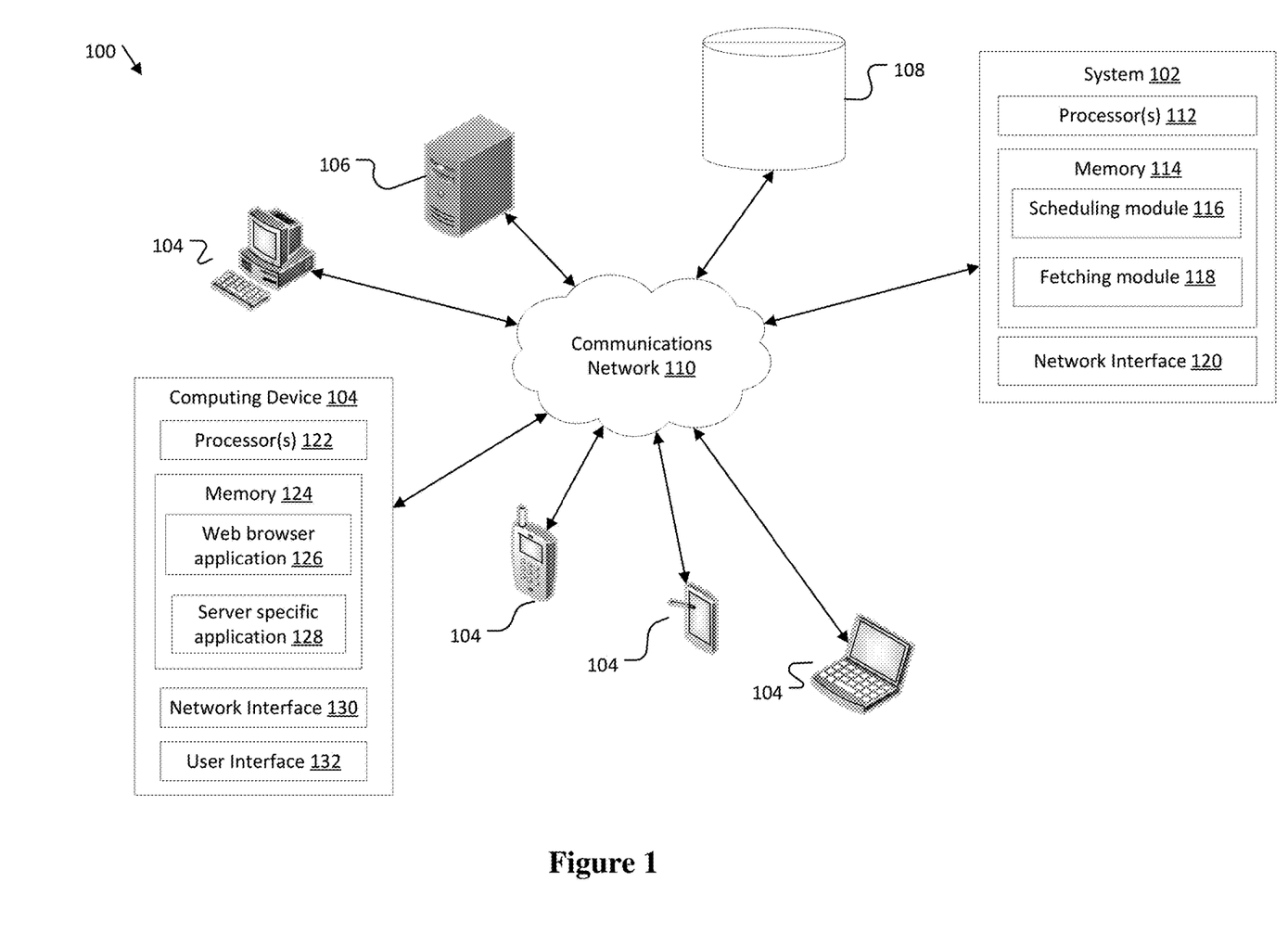
FIG. 1 is a schematic diagram of a communication system comprising one or more computing devices in communication with a server across a communications network.

Referring now to FIG. 1, there is shown a schematic of a communications architecture 100 comprising a system 102 in communication with one or more computing devices 104, a third party system or server 106, and in some embodiments, database 108, across a communications network 110. Examples of a suitable communications network 110 include a cloud server network, wired or wireless internet connection, Bluetooth™ or other near field radio communication, and/or physical media such as USB.

The system 102 may comprise one or more servers configured to perform or provide services to client devices, such as the one or more computing devices 104. In some embodiments, the system 102 may form part of an accounting system configured to maintain accounts for a plurality of entities and store financial and accounting related information, which may be stored in database 108. In some embodiments, the system 102 is distinct from an accounting system (not shown) but nonetheless may be configured to communicate with and provide services to the accounting system (not shown) across the communications network 106. In some embodiments the system 102 is a document management system.

The system 102 comprises one or more processors 112 and memory 114 storing instructions (e.g. program code) which when executed by the processor(s) 112 causes the system 102 to function according to the described methods. The processor(s) 108 may comprise one or more microprocessors, central processing units (CPUs), graphical/graphics processing units (GPUs), application specific instruction set processors (ASIPs), application specific integrated circuits (ASICs) or other processors capable of reading and executing instruction code.

Memory 114 may comprise one or more volatile or non-volatile memory types. For example, memory 114 may comprise one or more of random access memory (RAM), read-only memory (ROM), electrically erasable programmable read-only memory (EEPROM) or flash memory. Memory 114 is configured to store program code accessible by the processor(s) 112. The program code comprises executable program code modules. In other words, memory 114 is configured to store executable code modules configured to be executable by the processor(s) 112. The executable code modules, when executed by the processor(s) 112 cause the system 102 to perform certain functionality, as described in more detail below.

Memory 114 comprises a scheduling module or scheduling application 116 configured to determine a predicted time for performing a next or future fetching runs for a particular user account with a particular third party system to retrieve and import information to the system 102. Memory 114 may also comprise a fetching module or fetching application 118 configured to perform future fetching runs according to the predicted time, and in some embodiments, when successful, to import the retrieved information into the system 102. Although in some of the described embodiments both the scheduling application and the fetching application are deployed on the same system 102, it will be appreciated that in other embodiments, the scheduling application 116 may be deployed on a first system and the fetching application 118 may be deployed on a second system and the predicted times for retrieving information from a particular third party system 106 as determined by the scheduling application 116 may be made available to the fetching application for performing desired retrieval. For example, the scheduling application 116 may provide the predicted time directly to the fetching application, or may store it at a location accessible to the fetching application, for example, a remote database, such as database 108. The functionality provided by the scheduling application 116 and the fetching application 118 are discussed in more detail below with reference to FIG. 2.

The system 102 further comprises a network interface 120 to facilitate communications with components of the architecture 100 across the communications network 110, such as the one or more computing devices 104, database 108 and/or other systems or servers 106. The network interface 120 may comprise a combination of network interface hardware and network interface software suitable for establishing, maintaining and facilitating communication over a relevant communication channel.

The database 108 may form part of or be local to the system 102, or may be remote from and accessible to the system 102. The database 108 may be configured to store user details or encrypted credentials, such as username(s), password(s), biometric data and/or other user data associated with user accounts with third party systems 106. Any sensitive user data is encrypted for storage. The system 102, and in some embodiments, the fetching application 118, may use the users credentials to access associated user accounts with third party systems to thereby access and retrieve user related information therefrom. The database may store historical information or records about previous attempted fetching runs (successful and/or unsuccessful fetching runs) for one or more third party sources, and/or specific accounts with those third party sources. For example, the database may comprise a dataset for each of a plurality of third party sources or systems with which a particular user holds an account. The dataset may include an entry for a plurality of successful fetching runs, and in some embodiments, a plurality of successful successive fetching runs. The entry may include a retrieval date and in some embodiments, retrieval date and retrieval time, of when desired information was successfully retrieved. In some embodiments, the entry may also include an issue date indicative of when the information, or a document detailing the information was considered to have been made available or issued by the third party source. Alternatively or in addition, the dataset may comprise, for each entry, the document retrieved on the indicted retrieval date.

The computing device(s) 104 may comprise one or more processors 122 and memory 124 storing instructions (e.g. program code), which when executed by the processor(s) 122, causes the computing device(s) 104 to cooperate with the system 102 to allow users of the computing devices to access, view and manage information, such as user bookkeeping accounts, maintained by the system 102. For example, memory 124 may comprise a web browser application 126 to allow a user to engage with the website(s) hosted by system 102, and/or a system-specific application 128 which can be invoked to allow a user to engage with the functionality provided by the system 102.

The computing device(s) 104 comprises a network interface 130 to facilitate communication with the components of the communications network 110. The computer device(s) 104 may comprise also of a user interface 132 to allow the user to interact with the web browser application 126 and/or system-specific application 128 and other applications or functionality provided by the computing device(s) 104.

For example, in some embodiments, the scheduling application 116 may be configured to advise a user via the user interface 130 as to when certain information or documents may be available for viewing or otherwise accessing on the system 102. For example, the scheduling application 116 may be configured to provide alerts or other notification to the user interface 132. In some embodiments, a user may advise, for example, via the user interface 130, as to when they expect particular information to be issued or otherwise made available for accessing by a third party system 106. This suggested date (or date and time) may be used by the scheduling application to determine an estimated or inferred issuance date, for example.

Figure 2:
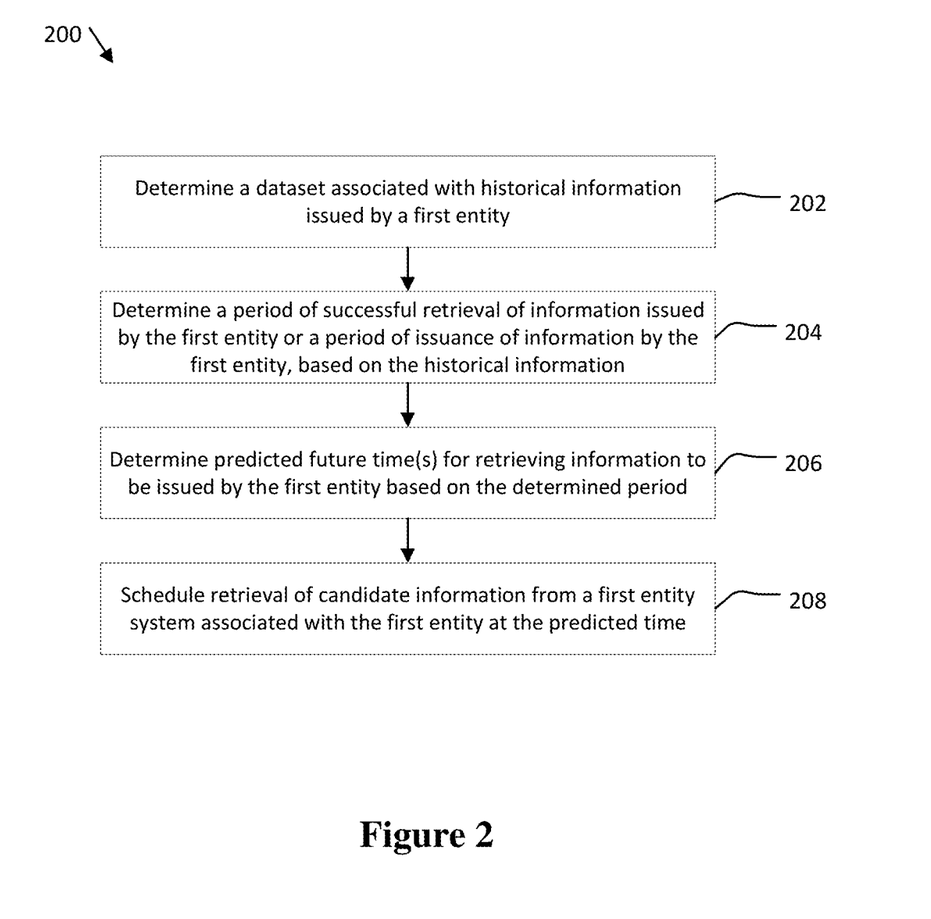
FIG. 2 is a process flow diagram of a method for determining a schedule for retrieving user account related information from a first entity system, according to some embodiments.

FIG. 2 is a process flow diagram of a method 200 for determining a schedule for retrieving information from a first entity system, which may be a third party system, according to some embodiments. The information may be user account related information. The method 200 may, for example, be implemented by the processor(s) 112 of system 102 executing instructions stored in memory 114, such as the scheduling application 116, and in some embodiments, the fetching application 118. Accordingly, the method 200 is a computer implemented method.

At 202, the system 102 determines a dataset associated with historical information issued by a first entity. The historical information may be historical information issued by the first entity in connection with a user's account with the first entity. The dataset comprises a plurality of entries, each entry including an information date. For example, the information date may be a retrieval date indicative of the date on which particular information was retrieved. The information date may be an issuance date indicative of the date of issuance of the particular information by the first entity. The information date may be an estimated issuance date indicative of an estimated date of issuance of the particular information by the first entity. For example, the estimated issuance date may be derived from user input, a best or random guess or derived from historical records of one or more successfully retrieved documents. For example, where the historical records indicate a relatively confident prediction in the cadence of issuance of particular information from a particular system, the estimated issuance date may be derived from the cadence (e.g. the first of the month). The information associated with each of the plurality of entries may comprise a financial document, such as a bank statement (current account, saving account, etc), a utility bill, telephone bill or statement, an invoice or a credit note, cheque or cheque image, a tax return document etc.

In some embodiments, the dataset is one of a plurality of sub-datasets of a super-dataset of historical information issued by the first entity, and which may be associated with the user's account. In such embodiments, each of the plurality of sub-datasets may be associated with a respective subaccount of the user's account with the first entity and the plurality of entries of the dataset are associated with a first subaccount of the user's account with the first entity. This may be the case, for example, where the first entity is a financial institution or bank with which the user holds multiple accounts, such as a savings account, a current account and a credit card account, and for which different documents issue at different times. For example, the bank may issue credit card bills on a monthly basis but issue savings accounts statements on a quarterly basis. Accordingly, the historical user account data for each of these types of accounts should be segregated from other such accounts with the same first entity to allow for worthwhile scheduling decisions to be made.

At 204, the system 102 determines a period of issuance of information or successful retrieval of information issued by the first entity based on the information dates of the plurality of entries in the dataset.

In some embodiments, the scheduling application is configured to determine a plurality of successful retrieval dates for each of the entries of the dataset and determine a representative time for performing fetching runs, such as a date or day of the month (e.g., the last Tuesday of the month), and in some embodiments, a time of the day, based on the plurality of successful retrieval dates. In some embodiments, the representative time is a function of the retrieval times of successful fetching runs of the dataset. In some embodiments, the representative time is the median of the plurality of retrieval times of successful fetching runs of the dataset.

In some embodiments, the scheduling application is configured to determine a plurality of issuance dates (or estimated issuance dates) for each of the entries of the dataset and determine a representative time for performing fetching runs, such as a date or day of the month (e.g., the last Tuesday of the month), and in some embodiments, a time of the day, based on the plurality of issuance dates (or estimated issuance dates). In some embodiments, the representative time is a function of the issuance times (or estimated issuance times) of the dataset. In some embodiments, the representative time is the median of the plurality of issuance times (or estimated issuance times).

In some embodiments, the scheduling application is configured to determine a cadence of the issuance, or estimated issuance, or retrieval of information (or document type). For example, the cadence of issuance may be weekly, monthly, fortnightly, quarterly, annually etc. The determined cadence may be used to determine how regularly a fetching run is to be scheduled to retrieve particular information from the third party source.

In some embodiments, the system 102 determines a cadence and/or periodicity of issuance of information by the first entity for the user and schedules retrieval of future information according to the determined cadence and/or periodicity. For example, the cadence may be annually, monthly, bi-monthly, weekly, etc. The system 102 may determine the cadence of issuance of information by the first entity by receiving input from a user via a user interface of the management system, for example, the input being indicative of the cadence of issuance of information by the first entity. The system 102 may determine the cadence of issuance of information by the first entity by receiving cadence information indicative of the cadence of issuance of information from the first entity.

In some embodiments, the scheduling application is configured to determine one or more intervals, each interval being indicative of a difference between a first retrieval date of first retrieved information and a second retrieval date of a next retrieved information, and to determine the cadence of retrieval as a function of the one or more intervals. In some embodiments, the scheduling application is configured to determine one or more intervals, each interval being indicative of a difference between a first issuance date of first issued information and a second issuance date of a next issued information, and to determine the cadence of issuance as a function of the one or more intervals. For example, the scheduling application may determine the cadence of issuance or retrieval as a median of the one or more intervals. In some embodiments, the scheduling application may determine the cadence of issuance or retrieval probabilistically, based on template or model distributions to which the distribution of the individual intervals of the dataset most closely matches.

The scheduling application may determine the period based on the determined cadence and the determined representative time for performing fetching runs.

At 206, the system 102 determines one or more predicted times for retrieving information to be issued by the first entity based on the determined period. The predicted time may be a particular date and in some embodiments, a time of day.

In some embodiments, the system 102 determines confidence scores for determined periods and/or predicted future time(s) for the datasets. The system may determine whether to schedule fetching runs at the predicted future time(s) based on the associated confidence scores. In some embodiments, for example, where confidence scores are relatively low, the scheduling application 116 may modify the predicted future time(s) to instead perform the fetching runs at a later time and/or date, to thereby increase confidence in the success of the fetching run. In some embodiments, the system is configured to more heavily weigh the importance of having up-to-date data against the cost of performing unsuccessful fetching runs, or vice versa. Alternatively, or in addition to confidence scores, such weightings may impact a decision to schedule a fetching run at a particular predicted future time or to perform it at a later time instead.

In some embodiments, the system 102 may determine the confidence scores based on a percentage of instances where the determined cadence aligns with the actual information date (retrieval date, issuance date, or estimated issuance date). In embodiments where the historical information comprises issuance dates, the confidence score associated with the determined periods and/or predicted future time(s) may be relatively high, based on the assumption that the information is actually retrievable on the issuance date. In embodiments where the historical information comprises a retrieval date, but perhaps not an issuance date, the confidence score associated with the determined periods and/or predicted future time(s) may be relatively low until a threshold or sufficient amount of historical information is available to increase the confidence in the determined periods and/or predicted future time(s).

For example, if the historical information comprises multiple instances of information with a given issuance date (for example, $1^{st}$), and if the system and or a user has indicated that the information issues or is made available monthly on the $1^{st}$, the confidence score associated with the determined periods and/or predicted future time(s) being the $1^{st}$ of the month is relatively high. On the other hand, if it is inferred that the information will be available on the $5^{th}$, but the historical information shows that information has been successfully retrieved on $7^{th}$, $4^{th}$, $3^{rd}$, and $2^{nd}$, the system 102 may determine that the determined periods and/or predicted future time(s) are too late, and that the information may be retrieval at an earlier date, and may reschedule the fetching run for an earlier date, such as $2^{nd}$.

At 208, the system 102 schedules retrieval of candidate information from a first entity system associated with the first entity at the predicted time.

By way of example only, consider the case where the historical information includes successful retrieval times of 16 Mar. 2020 at 3 pm, 16 Apr. 2020 at 2 pm, 14 May 2020 at 3 pm, 18 Jun. 2020 at 6 pm and 19 Jul. 2020 at 7 pm and 12 August at 1 pm. The cadence may be determined as monthly and the representative time may be determined as the $16^{th}$ at 3 pm. Accordingly, the period may be determined as monthly, on the $16^{th}$ at 3 pm, and the scheduling applications may schedule fetching applications to be performed on the $16^{th}$ of every month at 3 pm, with a next predicted date being determined by reference to the current date.

The system 102 may then seek to retrieve the candidate information at the predicted time. In some embodiments, the system 102 may determine user credentials associated with the user's account with the first entity system, and use the user credentials to access the user's account and retrieve the candidate information.

The system 102 may import the candidate information into a user's account of a document management system. For example, the user's account of a document management system may be a user's bookkeeping account and the system 102 may be an accounting system configured to maintain bookkeeping accounts for a plurality of entities.

Once candidate information has been successfully retrieved, the retrieval date may be saved as an entry in the dataset. In some embodiments, the scheduling application 116 is configured to dynamically or periodically update the predicted future times and/or the schedule as new retrieval times are added to entries of the dataset. This allows for any changes in behaviours regarding the issuance or making available of information by the third party systems to be accounted for by the scheduling application 116 and for the schedule to be adapted as required.

In some embodiments, the system 102 may determine an issue date of the candidate information and, responsive to determining that the issue date of the candidate information corresponds with an issue date of a previously retrieved candidate information issued by the first entity and associated with the user's account, determine a later predicted time. The system 102 may schedule retrieval of a subsequent candidate information associated with the user's account with the first entity from the first entity system during at the later predicted time. For example, the later predicted time may be a predefined number of hours after the predicted time.

In some embodiments, the system 102 may determine metadata of the candidate information and, responsive to determining that the metadata of the candidate information corresponds with metadata of a previously retrieved candidate information issued by the first entity and associated with the user's account, may determine a later predicted time. The system 102 may schedule retrieval of a subsequent candidate information associated with the user's account with the first entity from the first entity system at the later predicted time. For example, the later predicted time may be a predefined number of hours after the predicted time. In some embodiments, the system 102 compares the metadata of the candidate information with a plurality of previously retrieved candidate information, which may have been gathered or collected over a relatively long period of time, such as seven years.

If the system 102 then determines that an issue date of the subsequent candidate information post-dates the issue date of a previously retrieved candidate information issued by the first entity and associated with the user's account, the system 102 may add the subsequent candidate information to the dataset to generate an updated dataset and re-calculate or determine the period for retrieval of information issued by the first entity for the user based on the updated dataset.

In some embodiments, the scheduling application may be configured to undertake an optimisation process with a view to scheduling a fetching run as close to the time the information will be available at the third party system. This optimisation process may be a trial and error process to determine an optimised predicted future time with sufficient confidence of success. For example, based on the historical information the scheduling application could schedule a fetching run for three days after the issue date of the information. When performing the optimisation process, the scheduling application may attempt to retrieve the information earlier, and if successful, may update the predicted future time to the earlier time as an optimised predicted future time. For example, in some embodiments, the optimisation process may be performed if the confidence score associated with a prediction falls below a threshold.

In some embodiments, where an account with a third party system 106 is to be accessed by the fetching application 118 for a first time, the fetching application 118 may be configured to download or otherwise obtain historical information comprising the issuance of prior information or documents for importing into the database 108. The scheduling application 116 may then access the historical information to determine a predicted time of issuance of future information, and in some embodiments, schedule retrieval of future information at that time.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method comprising:
   determining a dataset associated with historical information issued by a first entity, wherein the dataset comprises a plurality of entries, each entry comprising an information date;
   determining one of:
      (i) a period of successful retrieval of information issued by the first entity based on the information dates of the plurality of entries in the dataset, wherein determining the period of successful retrieval of information comprises:
         determining a successful retrieval date for at least some of the plurality of the entries of the dataset; and
         determining a representative time for performing fetching runs as a median of the determined successful retrieval dates; or
      (ii) a period of issuance of information by the first entity of information by the first entity based on the information dates of the plurality of entries in the dataset, wherein determining the period of issuance of information by the first entity comprises:
         determining one of: (i) a cadence of issuance of the information by the first entity for the user, (ii) periodicity of issuance of the information by the first entity for the user; or (iii) cadence and periodicity of issuance of the information by the first entity for the user;
   determining a predicted time of issuance of future information by the first entity based on the determined period;
   scheduling retrieval of candidate information from a first entity system at the predicted time;
   retrieving the candidate information from the first entity system at the predicted time; and
   wherein the historical information of the dataset is historical information issued by the first entity in connection with a user's account with the first entity.

2. The method of claim 1, wherein the information date is one of: (i) a retrieval date indicative of the date on which the particular information was retrieved; or (ii) an issuance date indicative of the date of issuance of the particular information by the first entity; (iii) an estimated issuance date indicative of an estimated date of issuance of the particular information by the first entity.

3. The method of claim 1, wherein determining the cadence of issuance of information by the first entity comprises one or more of:

(i) receiving input from a user via a user interface, the input indicative of the cadence of issuance of information by the first entity;
(ii) receiving cadence information indicative of the cadence of issuance of information from the first entity; and
(iii) determining one or more intervals, each interval indicative of a difference between a first date of first information of the plurality of entries in the dataset and a next closest second date of second information of the plurality of entries and
(iv) determining the cadence of issuance as a function of the one or more intervals.

4. The method of claim 3, wherein determining the cadence of issuance as a function of the one or more intervals comprises determining the cadence of issuance as a median of the one or more intervals.

5. The method of claim 1, further comprising:
determining an information date of the candidate information;
determining that the information date of the candidate information corresponds with an information date of a previously retrieved candidate information issued by the first entity and associated with the user's account;
determining a later predicted time; and
scheduling retrieval of a subsequent candidate information associated with the user's account with the first entity from the system associated with the first entity at the later predicted time.

6. The method of claim 5, further comprising:
determining that subsequent candidate information is available at the updated predicted time;
adding the subsequent candidate information to the dataset to generate an updated dataset;
determining an updated period of successful retrieval of information based on the updated dataset;
determining an updated predicted time of issuance of future information by the first entity based on the determined updated period; and
scheduling retrieval of subsequent candidate information from a system associated with the first entity at the updated predicted time.

7. The method of claim 1, further comprising:
determining metadata of the candidate information;
determining that the metadata of the candidate information corresponds with metadata of a previously retrieved candidate information issued by the first entity and associated with the user's account;
determining a later predicted time; and
scheduling retrieval of a subsequent candidate information associated with the user's account with the first entity from the system associated with the first entity at the later predicted time.

8. The method of claim 1, further comprising determining a confidence score for: (i) the determined period; (ii) the predicted future times; or (iii) the determined period and the predicted future times.

9. The method of claim 8, further comprising:
determining that the confidence score is below a confidence threshold; and
changing the determined predicted future time to a later time.

10. The method of claim 1, wherein the historical information of the dataset is historical information issued by the first entity in connection with a user's account with the first entity.

11. The method of claim 10, wherein the dataset is one of a plurality of sub-datasets of a super-dataset of historical information issued by the first entity and associated with the user's account, each of the plurality of sub-datasets being associated with a respective subaccount of the user's account with the first entity and wherein the plurality of entries of the dataset are associated with a first subaccount of the user's account with the first entity.

12. The method of claim 10, further comprising:
determining user credentials associated with the user's account with the first entity system; and
using the user credentials to access the user's account and retrieve the candidate information.

13. The method of claim 12, wherein retrieving the candidate information comprises:
importing the candidate information into a user's account of a document management system.

14. A computing device comprising:
one or more processors; and
memory comprising computer executable instructions, which when executed by the one or more processors, cause the system to:
determine a dataset associated with historical information issued by a first entity, wherein the dataset comprises a plurality of entries, each entry comprising an information date;
determine one of:
(i) a period of successful retrieval of information issued by the first entity based on the information dates of the plurality of entries in the dataset, wherein determining the period of successful retrieval of information comprises:
determining a successful retrieval date for at least some of the plurality of the entries of the dataset; and
determining a representative time for performing fetching runs as a median of the determined successful retrieval dates; or
(ii) a period of issuance of information by the first entity of information by the first entity based on the information dates of the plurality of entries in the dataset, wherein determining the period of issuance of information by the first entity comprises:
determining one of: (i) a cadence of issuance of the information by the first entity for the user, (ii) periodicity of issuance of the information by the first entity for the user; or (iii) cadence and periodicity of issuance of the information by the first entity for the user;
determine a predicted time of issuance of future information by the first entity based on the determined period;
schedule retrieval of candidate information from a first entity system at the predicted time;
retrieve the candidate information from the first entity system at the predicted time; and
wherein the historical information of the dataset is historical information issued by the first entity in connection with a user's account with the first entity.

15. The computing device of claim 14, wherein the information date is one of: (i) a retrieval date indicative of the date on which the particular information was retrieved; or (ii) an issuance date indicative of the date of issuance of the particular information by the first entity; (iii) an estimated issuance date indicative of an estimated date of issuance of the particular information by the first entity.

16. The computing device of claim 14, wherein the dataset is one of a plurality of sub-datasets of a super-dataset of historical information issued by the first entity and associated with the user's account, each of the plurality of sub-datasets being associated with a respective subaccount of the user's account with the first entity and wherein the plurality of entries of the dataset are associated with a first subaccount of the user's account with the first entity.

17. A computer-readable storage medium storing instructions that, when executed by a computer, cause the computer to perform operations including:
 determining a dataset associated with historical information issued by a first entity, wherein the dataset comprises a plurality of entries, each entry comprising an information date;
 determining one of:
  (i) a period of successful retrieval of information issued by the first entity based on the information dates of the plurality of entries in the dataset, wherein determining the period of successful retrieval of information comprises:
   determining a successful retrieval date for at least some of the plurality of the entries of the dataset; and
   determining a representative time for performing fetching runs as a median of the determined successful retrieval dates; or
  (ii) a period of issuance of information by the first entity of information by the first entity based on the information dates of the plurality of entries in the dataset, wherein determining the period of issuance of information by the first entity comprises:
 determining one of: (i) a cadence of issuance of the information by the first entity for the user, (ii) periodicity of issuance of the information by the first entity for the user; or (iii) cadence and periodicity of issuance of the information by the first entity for the user;
 determining a predicted time of issuance of future information by the first entity based on the determined period;
 scheduling retrieval of candidate information from a first entity system at the predicted time;
 retrieving the candidate information from the first entity system at the predicted time; and
 wherein the historical information of the dataset is historical information issued by the first entity in connection with a user's account with the first entity.

18. The computer-readable storage medium of claim 17, wherein the information date is one of: (i) a retrieval date indicative of the date on which the particular information was retrieved; or (ii) an issuance date indicative of the date of issuance of the particular information by the first entity; (iii) an estimated issuance date indicative of an estimated date of issuance of the particular information by the first entity.

19. The computer-readable storage medium of claim 17, wherein the historical information of the dataset is historical information issued by the first entity in connection with a user's account with the first entity, and wherein the dataset is one of a plurality of sub-datasets of a super-dataset of historical information issued by the first entity and associated with the user's account, each of the plurality of sub-datasets being associated with a respective subaccount of the user's account with the first entity and wherein the plurality of entries of the dataset are associated with a first subaccount of the user's account with the first entity.

* * * * *